No. 895,038. PATENTED AUG. 4, 1908.
O. OTTO
PACKING
APPLICATION FILED AUG. 28, 1907.
2 SHEETS—SHEET 1
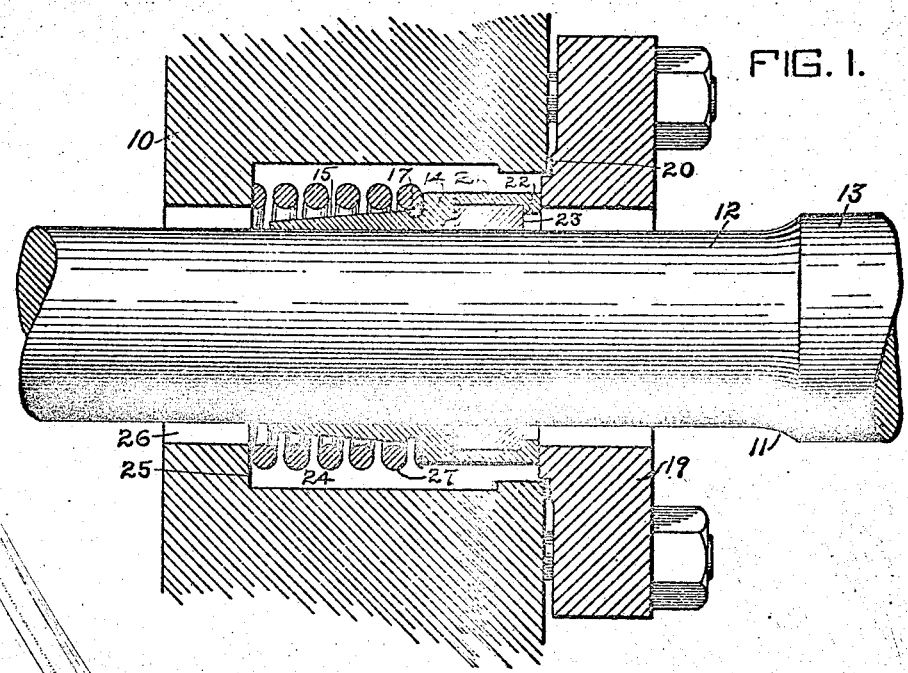
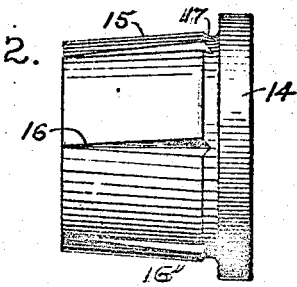
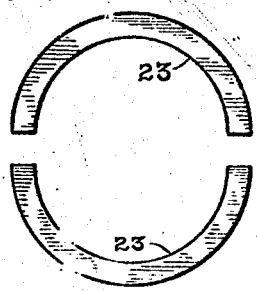
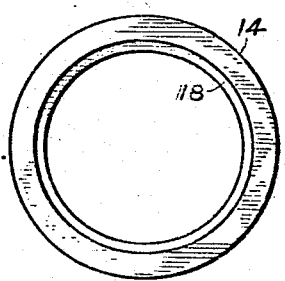
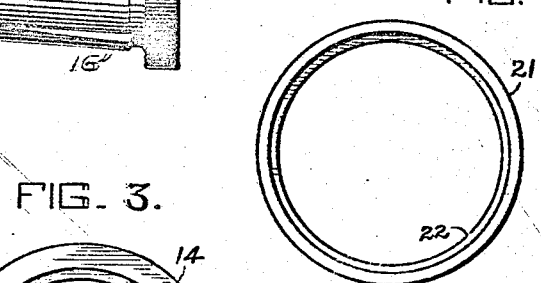
WITNESSES:
A. C. Fuller
Walter M. Fuller
INVENTOR
Oscar Otto
BY
Offield Towle & Linthicum
ATTORNEYS No. 895,038. PATENTED AUG. 4, 1908.
O. OTTO.
PACKING.
APPLICATION FILED AUG. 28, 1907.
2 SHEETS—SHEET 2.
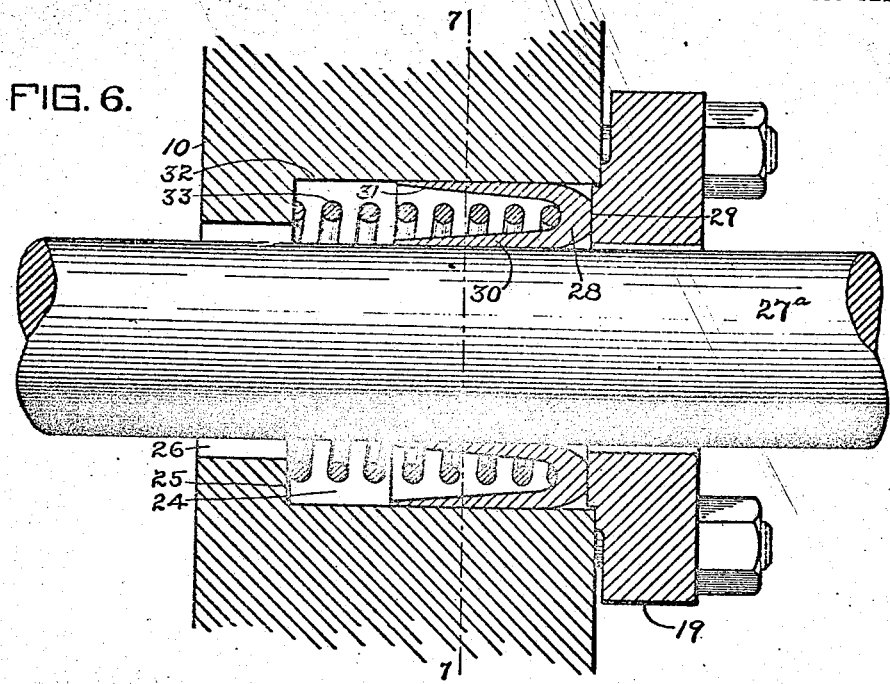
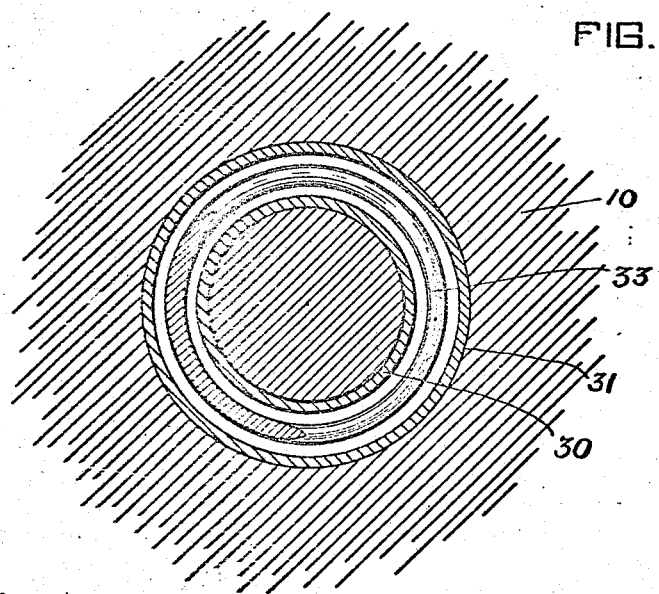
WITNESSES:
A. B. Fuller
Walter M. Fuller
INVENTOR
Oscar Otto
BY
Offield Towle & Linthicum
ATTORNEYS

UNITED STATES PATENT OFFICE.

OSCAR OTTO, OF MAYWOOD, ILLINOIS, ASSIGNOR OF ONE-HALF TO ROBERT QUAYLE, OF OAK PARK, ILLINOIS.

PACKING.

No. 895,038.　　　　Specification of Letters Patent.　　　Patented Aug. 4, 1908.

Application filed August 28, 1907. Serial No. 390,465.

*To all whom it may concern:*

Be it known that I, OSCAR OTTO, a citizen of the United States, residing at Maywood, in the county of Cook and State of Illinois, have invented certain new and useful Improvements in Packings, of which the following is a specification.

My invention relates to improvements in packings such as are used in steam engines, locomotives, air compressors, pumps, valves, and the like, and comprises a unitary or one-piece soft-metal packing ring adapted to encircle a piston rod or the like, being held by the steam or other fluid under pressure against the rod with sufficient force to form a pressure-tight joint between them, thereby preventing leakage. Preferably, though not necessarily, the packing is cast on the rod, a suitable mold for this purpose being temporarily clamped around the rod. Owing to the steam or other pressure to which the packing ring is subjected, the wear of the packing is automatically taken up, thereby securing a satisfactory operation of the device until the packing has completely worn out, when it may be quickly, readily, and economically replaced. To facilitate the compression of the soft metal of the packing to enable it to readily grasp the rod on which it is fitted, the packing may be made tapered or of conical shape to provide a portion comparatively thin and of reduced cross-section, and if desired the outer surface of the packing may be grooved to provide portions of small cross-sections for the same purpose. The steam or other fluid pressure not only holds the packing ring tightly on the rod, but it also maintains a pressure-tight joint between either the packing ring itself or an interposed chafing ring and the gland. To hold the packing ring in place against the chafing member or gland during the back stroke of the piston rod after the steam has been shut off, I have interposed a coil expansion spring between the same and a shoulder of the cylinder wall.

I have illustrated the preferred embodiments of my invention on the accompanying drawings, which form a part of this specification, like reference characters referring to the same parts throughout the views.

On said drawings Figure 1 is a section through a portion of the steam cylinder of a stationary engine or locomotive illustrating the construction and position of my improved packing; Fig. 2 is a face view of the packing ring; Fig. 3 is an elevation of the right hand end of the packing as viewed in Fig. 2; Fig. 4 illustrates the chafing ring; Fig. 5 shows the companion parts of the divided bushing interposed between the chafing ring and the piston rod; Fig. 6 is a view similar to Fig. 1 of a modified form of packing; and Fig. 7 is a vertical cross-section on line 7—7 of Fig. 6.

Referring first to Figs. 1 to 5, inclusive, it will be noted that the steam cylinder 10 of the locomotive or similar device has the usual aperture through its wall within which reciprocates the piston rod 11 having portions of lesser and greater diameter 12 and 13, respectively. Encircling the part 12 of the piston rod and placed thereon preferably by casting the same around the rod is one form 14 of my improved packing ring, which is made of any suitable soft metal such as white metal. Desirably a mold is temporarily clamped on the piston rod and the molten metal poured into the same to form the packing ring. It may be produced, however, in any other manner and slid on the rod if found more convenient to do so. The main body 15 of the ring is preferably tapered, as illustrated, to produce at one end of the ring a portion comparatively thin, thereby enabling the steam under pressure in the cylinder to compress the same sufficiently so that it snugly hugs the piston rod 12. In order to facilitate this compression of the soft metal which is necessary to permit the same to grasp the rod tightly, the packing may be longitudinally grooved or scored at a plurality of places 16, as indicated in Fig. 3. Also the packing may be circularly grooved at 17 for the same purpose. The right hand end of the packing ring, as illustrated, is of substantial thickness and width and the hole or bore through the center of the ring is desirably countersunk at 18 to provide a recess for the accommodation of any fins of the soft metal which may have a tendency to form around the rod.

A gland 19 is fastened in any approved manner to the outer face of the steam cylinder, as indicated, and has interposed between it and the cylinder a packing ring 20 which maintains a tight joint between the gland and cylinder, as is obvious. I prefer to place between the end of the packing ring 14 and the gland 19 a chafing member or one-piece or undivided ring 21. It is of advantage to be able to slip such a chafing ring on to the reduced portion 12 of the piston rod over the larger portion 13 thereof. Consequently I use between the packing and the gland the integral ring 21 having at one edge an inwardly-extended circular flange 22, the internal diameter of which is sufficiently great to allow the ring to be slid over the large part 13 of the piston rod. In order to maintain this chafing ring in place, I interpose between the same and the piston rod 11 a divided bushing 23, the two parts of which are shown in Fig. 5.

The chamber 24 in the wall of the steam cylinder having the shoulder 25 is in communication with the interior of the cylinder by the circular passage 26 around the piston rod. To push the packing 14 against the chafing ring 21 and the latter against the gland so as to prevent inward movement of the packing during similar movement of the piston rod after steam has been shut off, that is when there is no fluid pressure to maintain the parts in their normal position, I place between shoulder 25 and the enlarged part of the packing a coiled expansion spring 27 which exerts sufficient pressure against the packing to hold the same against the chafing-ring and the latter against the gland. In addition to the friction between the packing and rod tending to displace the former after steam has been shut off, a vacuum is created in the steam cylinders whereby the atmospheric pressure on the outer end of the packing or chafing member tends to move the packing inwardly. The spring is made sufficiently strong to counteract both of these forces, but it is to be understood, however, that this spring is not depended upon for maintaining a pressure-tight joint, this result being accomplished solely by the steam pressure. If the piston rod has a lateral movement due to faulty guiding of the cross-head, whatever chafing occurs takes place between ring 21 and gland 19, and since these are not made of soft metal no considerable wearing occurs. There is substantially no chafing between the packing 14 and ring 21 when the piston rod moves laterally because they both travel with the rod.

In Figs. 6 and 7 I have illustrated a modified construction in which the chafing member is omitted. This device comprises a wall 10 of the steam cylinder, the gland 19, between which and the cylinder no packing 20 is used in this form of device, the chamber or compartment 24, the circular shoulder 25, and the passage 26. This modified form of soft metal packing 28 may be cast on the piston rod 27ª or may be slid on to the same, as is obvious. At its outer end it has a flat face 29 which bears against the inner surface of the gland 19, and it also has extended inwardly a pair of concentric inner and outer tapered flanges 30 and 31. The internal surface of flange 30 fits about and snugly grasps the piston rod 27ª, while the outer face of the substantially parallel circular flange 31 under the influence of the steam pressure is expanded sufficiently to bear against the cylindrical surface 32 of chamber 24. It is obvious that the steam pressure in this chamber acts upon the packing to push the same against the gland, the latter acting as an abutment. It is apparent, also, that the steam pressure forces the flanges 30 and 31 into engagement with the piston rod and wall of the steam cylinder, respectively, forming tight joints with each. In order to prevent the packing from moving away from the gland during the reverse stroke of the piston rod after steam has been shut off, I interpose between the shoulder 25 and the packing an expansion coil spring 33, a considerable portion of which fits in the packing between the flanges 30 and 31, as illustrated. It is obvious that with this single soft metal packing a tight connection is maintained between the same and the connecting rod and cylinder wall. The automatic taking up or compensating for wear on the packing occurs in this style or form of the device as it does in the form shown in the other figures.

In either of the devices shown and described the packing may be readily removed by unbolting the gland and a new one substituted therefor which may be cast on the rod or cast separately and slid on to the rod, as appears most desirable.

Although I have shown the chafing member in connection with only one style or form of the packing, it is to be understood that any suitable form of chafing ring may be used in the structure shown in Figs. 6 and 7. Also in this structure the flanges 30 and 31 may be grooved or scored if found desirable.

In this specification I have described in detail the features of my invention, but it is to be understood that the invention is not limited to the precise and specific structural features shown and described, since many minor mechanical changes may be made without sacrificing the benefits and advantages of my invention and without departure from its substance and essence.

Although I have described my invention in connection with a steam engine, it is to be understood that it has many other uses such as, for example, in an air-compressor, valve, pump, or the like.

I claim:

1. The combination of a rod, and a one-piece metallic packing encircling said rod and adapted to be compressed and held against the same by fluid pressure thereby forming a tight joint between the two, substantially as described.

2. The combination of a rod, and a one-piece soft-metal packing ring encircling said rod and adapted to be compressed to grasp the same under the action of fluid pressure, thereby forming a tight joint between the two, substantially as described.

3. The combination of a rod, and a one-piece metallic packing ring encircling said rod, cast on the same, and adapted to be compressed to grasp the rod under the action of fluid pressure thereby forming a tight joint between the two, substantially as described.

4. The combination of a rod, and a one-piece tapered soft-metal packing encircling said rod and adapted to be compressed to grasp the same under the action of fluid pressure, thereby forming a tight joint between the two, substantially as described.

5. The combination of a rod, and a one-piece soft-metal grooved packing ring encircling said rod and adapted to be compressed to grasp the same under the action of fluid pressure thereby forming a tight joint between the two, substantially as described.

6. As an article of manufacture, a one-piece soft-metal packing adapted to encircle a rod and be compressed to grasp the same under the action of fluid pressure thereby forming a tight joint between the two, substantially as described.

7. As an article of manufacture, a one-piece tapered soft-metal packing adapted to encircle a rod and be compressed to grasp the same under the action of fluid pressure thereby forming a tight joint between the two, substantially as described.

8. The combination of a chamber adapted to contain a fluid under pressure, a rod movable in an aperture through a wall of said chamber, a soft-metal one-piece packing encircling said rod and caused to grasp the same by the pressure of the fluid thereby forming a tight joint between the two, an abutment against which said packing rests, and a spring pressing said packing against said abutment, substantially as described.

9. The combination of a chamber adapted to contain a fluid under pressure, a rod movable in an aperture through a wall of said chamber, a soft-metal one-piece packing encircling said rod and caused to grasp the same by the pressure of the fluid thereby forming a tight joint between the two, a gland, and a chafing member interposed between said gland and packing, substantially as described.

10. The combination of a chamber adapted to contain a fluid under pressure, a rod movable in an aperture through a wall of said chamber, a soft-metal one-piece packing encircling said rod and caused to grasp the same by the pressure of the fluid thereby forming a tight joint between the two, a gland, a chafing member interposed between said gland and packing, and a spring pressing said packing against the chafing member and the latter against the gland, substantially as described.

11. The combination of a chamber adapted to contain a fluid under pressure, a rod with portions of greater and lesser diameter, the part of lesser diameter being movable in an aperture through a wall of said chamber, a soft-metal one-piece packing encircling the smaller portion of said rod and caused to grasp the same by the pressure of the fluid thereby forming a tight joint between the two, a gland, a chafing member interposed between said gland and packing and having an aperture sufficiently large to permit the member to pass over the larger portion of said rod, and a divided bushing between said chafing member and the smaller portion of said rod, substantially as described.

12. The combination of a chamber adapted to contain a fluid under pressure, a rod having portions of greater and lesser diameter, the smaller portion of said rod being movable in an aperture through a wall of said chamber, a soft-metal one-piece packing encircling the smaller portion of said rod and caused to grasp the same by the pressure of the fluid thereby forming a tight joint between the two, a gland, an apertured chafing member interposed between said packing and gland, the aperture of said member being sufficiently large to allow the member to pass over the larger portion of said rod, a divided bushing interposed between said chafing member and the smaller portion of said rod, and a spring acting on said packing to push the same against the chafing member and the latter against the gland, substantially as described.

OSCAR OTTO.

Witnesses:
WALTER M. FULLER,
FREDERICK C. GOODWIN.